(12) United States Patent
Chang et al.

(10) Patent No.: US 7,401,195 B2
(45) Date of Patent: Jul. 15, 2008

(54) PORTABLE DATA STORAGE DEVICE AND METHOD OF ACCESSING DATA THEREOF

(75) Inventors: Chi-Tung Chang, Taipei (TW);
Shih-Hsieng Yang, Taipei County (TW);
Hung-Chou Tsai, Nantou County (TW);
Ching-Wen Wang, Taipei County (TW)

(73) Assignee: Alcor Micro, Corp., Taipei (TW)

( * ) Notice: Subject to any disclaimer, the term of this patent is extended or adjusted under 35 U.S.C. 154(b) by 446 days.

(21) Appl. No.: 10/966,801

(22) Filed: Oct. 18, 2004

(65) Prior Publication Data
US 2006/0085596 A1 Apr. 20, 2006

(51) Int. Cl.
*G06F 12/14* (2006.01)
(52) U.S. Cl. .................................. 711/163; 711/115
(58) Field of Classification Search .............. None
See application file for complete search history.

(56) References Cited
U.S. PATENT DOCUMENTS
2003/0225971 A1* 12/2003 Oishi et al. ............. 711/115
2004/0042363 A1* 3/2004 Kobayashi et al. ........ 369/53.21
2005/0015540 A1* 1/2005 Tsai et al. ................. 711/115
2005/0083741 A1* 4/2005 Chang et al. .............. 365/200

* cited by examiner

*Primary Examiner*—Denise Tran
(74) *Attorney, Agent, or Firm*—WPAT, P.C.; Anthony King

(57) ABSTRACT

A portable data storage device includes a control unit coupled via a predetermined interface with a computer having an operating system with user authority limits, and a memory divided into a segment I for storing related applications, a public segment II for temporarily storing instructions and data, and a hidden segment III for saving client data. In a method of accessing data via the portable data storage device, when the computer is to write data into or read data from the segment III, the data to be written or read is first temporarily stored in the segment II, and specific read or write instructions for a read/write level application interface are written into the segment II by the applications in the segment I and executed, so as to complete data exchange and access between the portable data storage device and the computer.

8 Claims, 2 Drawing Sheets

PORTABLE DATA STORAGE DEVICE AND METHOD OF ACCESSING DATA THEREOF

FIELD OF THE INVENTION

The present invention relates to a portable data storage device and method of accessing data thereof, and more particularly to a portable data storage device and method of accessing data thereof that allows an operator to log on an operating system with user authority limits using a general user account to access data stored in the portable data storage device.

BACKGROUND OF THE INVENTION

With the high development of Internet, various kinds of software for browsing information over Internet have been constantly developed and introduced into the market. Among others, Microsoft™ Windows™ System is an operating system best welcome by consumers and having the highest share in the market. However, since it has some backdoor programs not completely removed therefrom, Microsoft™ Windows™ System has become a medium for hackers to invade computer systems. Besides, it also has constantly increased problems with viruses and garbage mails. All these factors have forced information administrators of general companies to spend a lot of time and efforts in computer system management. A feasible and common way to solve the above-mentioned problems is to set limits to the authority of accessing data via user accounts. Currently, Windows™ 2000, Windows™ NT, Windows™ XP, and Windows™ 2003 are some Microsoft™ operating systems that have user authority limits.

Meanwhile, there are also some new issues arisen with the popularization of portable flash storage devices. For instance, when a user installs a driver of a portable flash storage device in an operating system with user authority limits via a USB interface, the use of the portable flash storage device might require a certain application in an application programming interface (API), which is referred to as "application programming interface of small computer system interface" (SCSI API) in Microsoft™ Windows™. However, functions provided by the API can be accessed only by an operator who logs on the operating system at the administrator level. Therefore, in the above-described operating environments, an operator logged on the operating system at the general user level is not able to drive the portable flash storage device in a fully normal manner. Moreover, portable flash storage devices corresponding to different Windows™ operating systems do not operate in the same one manner, which also causes inconveniences in using these portable flash storage devices.

It is therefore tried by the inventor to develop a portable data storage device and method of accessing data thereof to overcome problems existed in using conventional portable flash storage devices in operating systems with user authority limits.

SUMMARY OF THE INVENTION

A primary object of the present invention is to provide a portable data storage device and method of accessing data thereof that enables data exchange and access between the device and an external computer having an operating system with user authority limits.

To achieve the above and other objects, the portable data storage device of the present invention includes a control unit coupled via a predetermined interface with an external computer having an operating system with user authority limits, and a memory divided into a segment I for storing related applications, a public segment II for temporarily storing instructions and data, and a hidden segment III for saving client data. In the method of accessing data stored in the portable data storage device, data to be written into or client data to be read from the segment III by the external computer is first temporarily stored in the segment II, and specific read or write instructions for an add-on read/write level application interface in the applications stored in the segment I are written into the segment II and executed, so as to complete data exchange and access between the portable data storage device and the external computer that has an operating system with user authority limits.

BRIEF DESCRIPTION OF THE DRAWINGS

The structure and the technical means adopted by the present invention to achieve the above and other objects can be best understood by referring to the following detailed description of the preferred embodiments and the accompanying drawings, wherein.

DETAILED DESCRIPTION OF THE PREFERRED EMBODIMENTS

Figure 1:
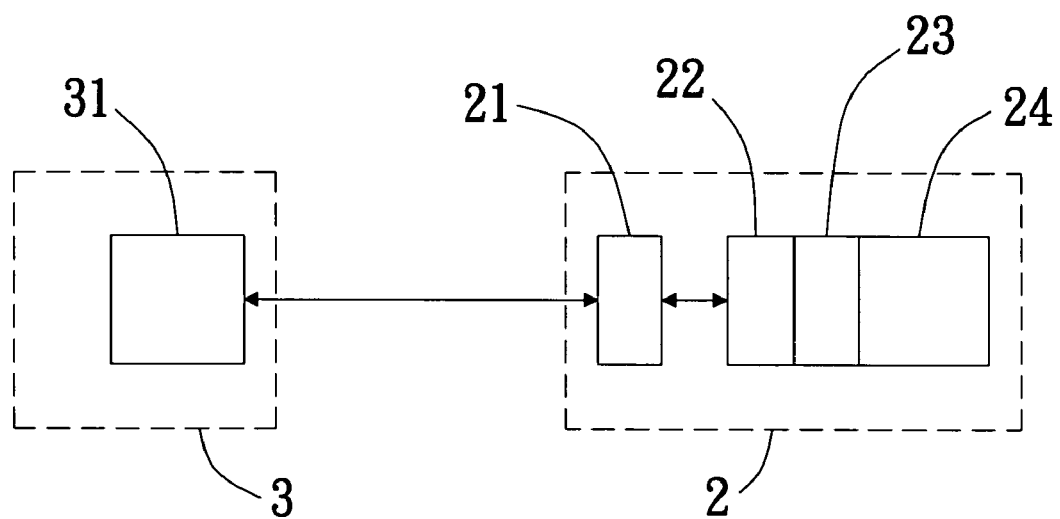
FIG. 1 is a block diagram of a portable data storage device according to the present invention.

Please refer to FIG. 1 that is a block diagram of a portable data storage device according to the present invention. As can be clearly seen from FIG. 1, the portable data storage device, which is generally denoted by reference numeral 2, mainly includes a control unit 21, and a memory that is divided into three segments, namely, a segment I 22, a segment II 23, and a segment III 24. The control unit 21 is adapted to couple with a corresponding processing unit 31 in an external computer 3 via a predetermined interface, such as a USB interface, so as to connect the computer 3 to the portable data storage device 2 to enable reading and writing of data from and into the portable data storage device 2. The segment I 22 is used to store related applications. The segment II 23 is a public segment used as a register to temporarily store various instruction files and data files. Data can be freely read from or stored in the data files stored in the segment II 23. The segment III 24 is a hidden segment used to save client data. Data cannot be freely read from or store in this segment III 24.

Figure 2:
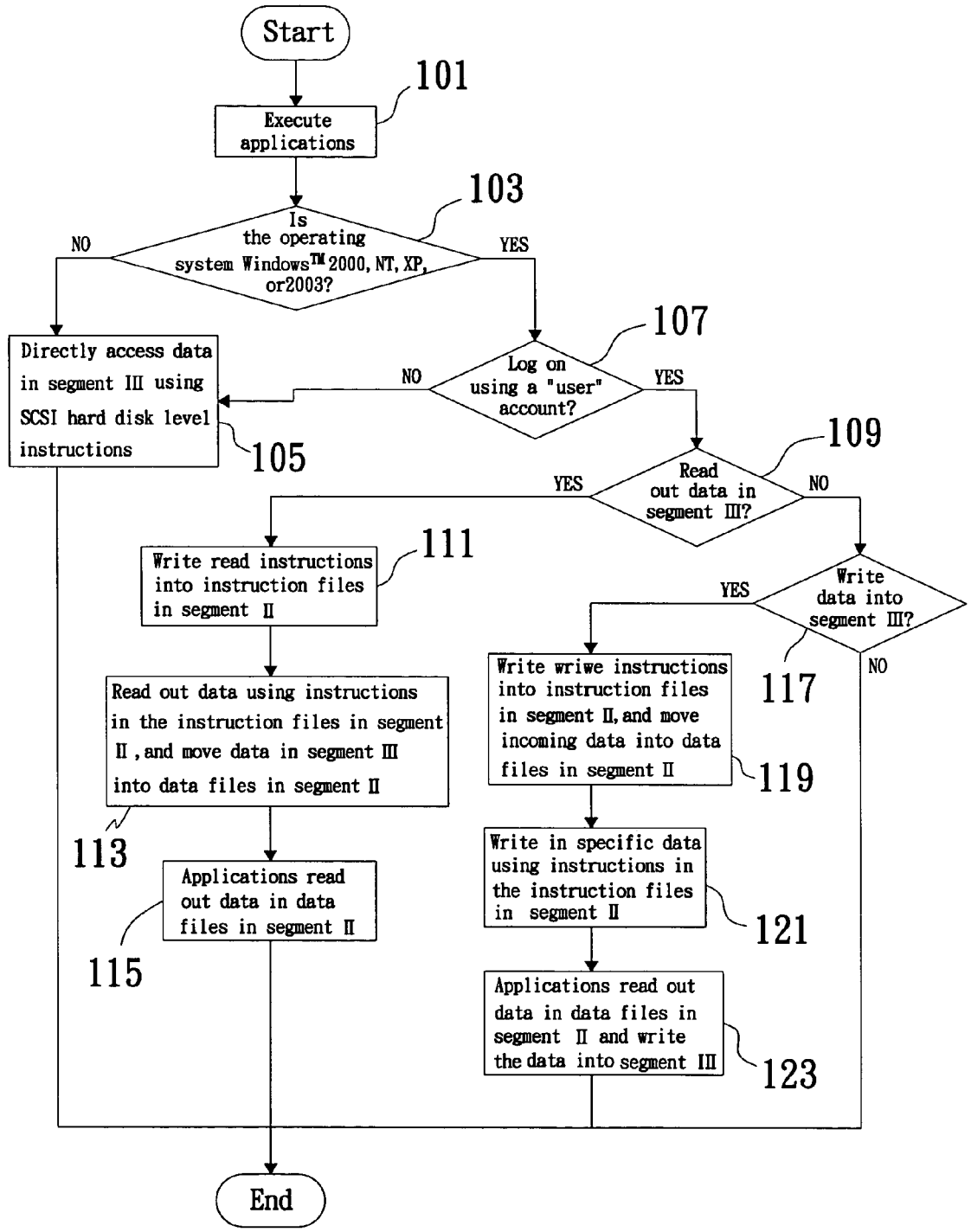
FIG. 2 is an overall flowchart showing the steps included in the method of accessing data via the portable data storage device of the present invention.

FIG. 2 is an overall flowchart showing the steps included in a method of accessing data via the portable data storage device 2 of the present invention. First, the portable data storage device 2 of the present invention is coupled with the processing unit 31 of the computer 3. Then, in Step 101 of executing applications, the related applications or drivers stored in the segment I 22 are set up in the computer 3. Then, in Step 103, it is verified whether the computer 3 has an operating system of Windows™ 2000, NT, XP, or 2003 that has user authority limits. If not, it means there is not a problem of different levels of user authority limits, and, in Step 105, the computer 3 is allowed to directly access client data in the hidden segment III of the portable data storage device 2 using SCSI hard disk level instructions. Or, if the verification result in Step 103 is yes, it means there are different levels of limits to user authority in using the computer 3, and an operator's identity is further verified in Step 107 by checking whether the operator logs on the operating system using a "user"

account. If not, it means the operator logs on the operating system at an "administrator" level, and Step 105 is repeated. Or, if the verification result in Step 107 is yes, it means the operator logs on the operating system using a "user" account and is not allowed to use the SCSI hard disk level instructions. In this case, it is further verified in Step 109 whether the operator is to read the client data stored in the hidden segment III or not. If yes, in Step 111, related read instructions are written into the instruction files in the segment II; and, in Step 113, applications in the segment I 22 load specific read instructions for a read/write level application interface into the instruction files in the segment II, and firmware is used to check and execute the instructions in the instruction files in the segment II to enable movement of the client data in the segment III into the data files in the segment II. Finally, in Step 115, the computer 3 reads out the client data in the data files in the public segment II 23. Or, if the verification result in Step 109 is No, it is further verified in Step 117 whether the operator is to write data into the segment III or not. If yes, in Step 119, related write instructions are written into the instruction files in the segment II and incoming data is moved into the data files in the segment II, and, in Step 121, specific write instructions for the read/write level application interface are loaded by the applications in the segment I 22 into the instruction files in the segment II, and incoming data from the computer 3 is temporarily stored in the data files in the segment II, and firmware is used to check and execute the instructions in the instruction files in the segment II. Finally, in Step 123, the applications stored in the segment I 22 read out data in the data files in the segment II and write the same into the hidden segment III.

With the above-mentioned steps, it is possible for an operator logged on an operating system of a computer with user authority limits using a general "user" account to effectively execute accessing of data via the portable data storage device of the present invention.

What is claimed is:

1. A method of accessing data via portable data storage device, comprising the steps of:
    (a) executing predetermined applications or drivers in a segment I of a memory of said portable data storage device to set up said applications or drivers in a corresponding external electronic apparatus;
    (b) verifying whether the electronic apparatus has an operating system with different levels of limits to user authority;
    (c) verifying whether an operator logs on the operating system using a "user" account when a result from the step (b) is yes, so as to verify the operator's identity;
    (d) allowing said electronic apparatus to use instructions of a higher level to directly access data in a hidden segment III of the memory of said portable data storage device when the result from the step (b) is no, or when the result from the step (c) is no to indicate the operator logs on the operating system using an administrator account level;
    (e) allowing applications stored in the segment I of the memory of said portable data storage device to load specific read instructions for a read/write level application interface into a public segment II of the memory of said portable data storage device;
    (f) using firmware to check and execute the read instructions in said segment II, in order to move client data stored in said hidden segment III to said public segment II;
    (g) allowing the applications stored in the segment I of the memory of said portable data storage device to read out data in the segment II, so as to output the client data in said public segment II to said external electronic apparatus;
    (h) allowing the applications stored in the segment I of the memory of said portable data storage device to load specific write instructions for the read/write level application interface into said public segment II, and temporarily storing incoming data from said external electronic apparatus in said segment II; and
    (i) using firmware to check and execute instructions in said public segment II, so as to write the incoming data stored in said public segment II into said hidden segment III.

2. The method of accessing data via portable data storage device as claimed in claim 1, wherein said instructions of a higher level are SCSI hard disk level instructions.

3. The method of accessing data via portable data storage device as claimed in claim 1, wherein said read instructions and write instructions are written into instructions files in said segment II.

4. The method of accessing data via portable data storage device as claimed in claim 2, wherein said read instructions and write instructions are written into instruction files in said segment II.

5. The method of accessing data via portable data storage device as claimed in claim 1, wherein said data to be read or written is temporarily stored in data files in said segment II.

6. The method of accessing data via portable data storage device as claimed in claim 2, wherein said data to be read or written is temporarily stored in data files in said segment II.

7. The method of accessing data via portable data storage device as claimed in claim 3, wherein said data to be read or written is temporarily stored in data files in said segment II.

8. The method of accessing data via portable data storage device as claimed in claim 4, wherein said data to be read or written is temporarily stored in data files in said segment II.

* * * * *